T. ALSOP.
SPRING FOR MILL SPINDLES.
No. 81,456. Patented Aug. 25, 1868.
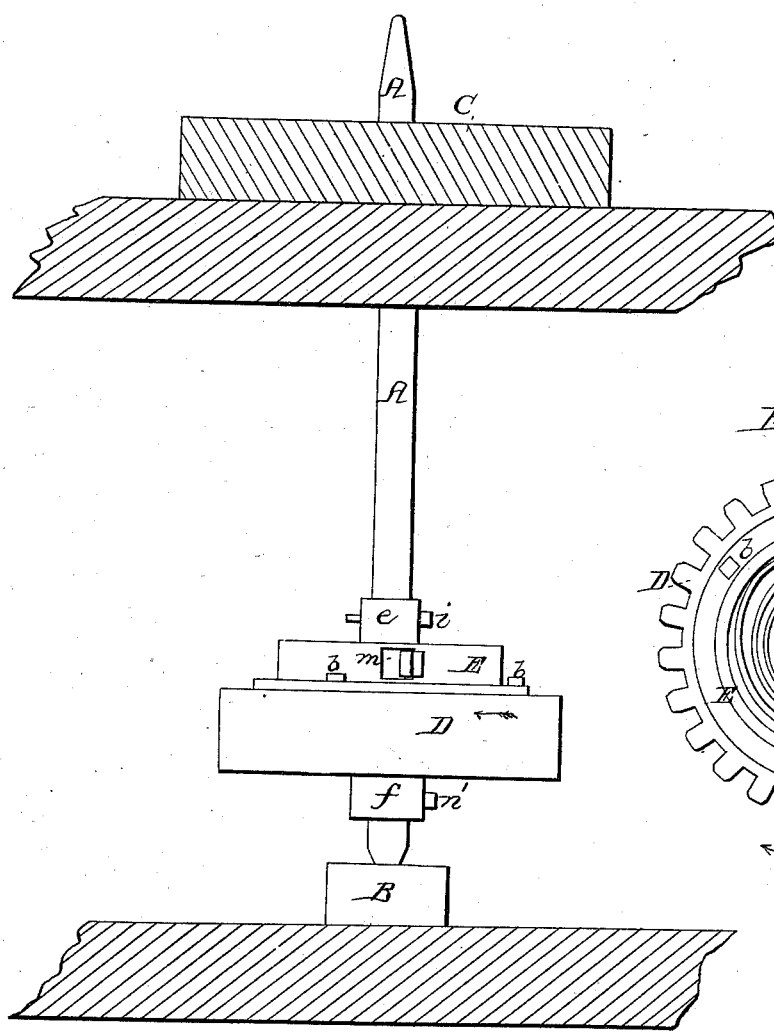

United States Patent Office.

THOMAS ALSOP, OF ELKHART CITY, ILLINOIS.

Letters Patent No. 81,456, dated August 25, 1868.

IMPROVEMENT IN THE MODE OF ATTACHING SPRINGS TO MILL-SPINDLES.

*The Schedule referred to in these Letters Patent and making part of the same.*

TO ALL WHOM IT MAY CONCERN:

Be it known that I, THOMAS ALSOP, of the town of Elkhart City, in the county of Logan, and State of Illinois, have invented a new and useful Improvement on Springs for Mill-Spindles; and I do hereby declare that the following is a full, clear, and exact description of the construction and operation of the same, reference being had to the annexed drawings, making a part of this specification, in which—

Figure 1 is a side view, and
Figure 2 is a vertical view.

The object of my invention is to prevent the jar or backlash so generally found in mill-gearing.

A represents the mill-spindle, having its bearings in the step B and the lower millstone C. D is the pinion, by which motion is communicated to the spindle A. E is a metallic case, fastened to the pinion by the bolts $b\ b\ b$, and having an opening, or other suitable device, to which the outer coil of the spring $m$ is attached. $e$ is a sleeve, fitting upon the spindle, sufficiently loose to be easily raised and lowered, and prevented from turning upon the spindle by the bolt $i$, or other suitable device, and attached to the spring $m$ by the catch $n$. The pinion D is supported by the hub $f$, which is fastened upon the spindle by a set-screw, $n'$.

It will be seen that, when the pinion D is moved in the direction indicated by the arrow, it will communicate motion to the spindle A through the spring $m$, the elasticity of which will equalize its motion, and the pinion D may at any time be easily disconnected from its driving-wheel, by raising it with the spring $m$ and the sleeve $e$ upon the spindle.

I do not claim the use of a spring for equalizing the motion, as I am aware that springs of various kinds have been in use for that purpose.

I claim the combination of case E, pinion D, shaft A, and spring $m$, with its outer end attached to the case E, and the inner end attached to the spindle by the sleeve $e$, arranged substantially as described, and for the purpose specified.

THOMAS ALSOP.

Witnesses:
 THOS. JEWELL,
 WM. J. DONOVAN.